US008339913B2

(12) United States Patent
Hwang et al.

(10) Patent No.: US 8,339,913 B2
(45) Date of Patent: Dec. 25, 2012

(54) INFORMATION STORAGE MEDIUM, RECORDING AND REPRODUCING APPARATUS, AND RECORDING AND REPRODUCING METHOD

(75) Inventors: Sung-hee Hwang, Suwon-si (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 12/912,334

(22) Filed: Oct. 26, 2010

(65) Prior Publication Data

US 2011/0096642 A1 Apr. 28, 2011

Related U.S. Application Data

(60) Provisional application No. 61/272,716, filed on Oct. 26, 2009.

(30) Foreign Application Priority Data

Jun. 11, 2010 (KR) ........................ 10-2010-0055647

(51) Int. Cl.
*G11B 7/00* (2006.01)

(52) U.S. Cl. .................................. 369/53.17; 369/47.14

(58) Field of Classification Search ............... 369/47.14, 369/53.17
See application file for complete search history.

(56) References Cited

U.S. PATENT DOCUMENTS

2004/0165496 A1 8/2004 Park et al.
2007/0086281 A1 4/2007 Terada et al.
2008/0247281 A1 10/2008 Maeda et al.
2009/0257328 A1 10/2009 Park et al.
2010/0309765 A1 12/2010 Hwang et al.
2011/0219393 A1 * 9/2011 Kato et al. .................... 720/718

FOREIGN PATENT DOCUMENTS

JP 4026519 B2 10/2007
KR 10-2004-0081525 A 9/2004
KR 10-2005-0095901 A 10/2005
KR 10-2005-0109532 A 11/2005

OTHER PUBLICATIONS

International Search Report (PCT/ISA/210) and Written Opinion (PCT/ISA/237) dated Jun. 27, 2011, in International Application No. PCT/KR2010/007392.

* cited by examiner

*Primary Examiner* — Latanya Bibbins
(74) *Attorney, Agent, or Firm* — Sughrue Mion, PLLC

(57) ABSTRACT

A computer readable medium, apparatus, and method for efficiently managing a space bitmap. A computer readable medium includes: a user data area on which user data is recorded; and a temporary disc management area on which a space bitmap indicating a recording status of recording and reproducing unit blocks of the user data area is recorded. The space bitmap includes header information for distinguishing an additional space bitmap from the space bitmap. The additional space bitmap is assigned when a space provided for the space bitmap is insufficient to represent the recording status of the recording and reproducing unit blocks of the user data area.

5 Claims, 12 Drawing Sheets

FIG. 3

| | 25GB/L | 32GB/L | 33.4GB/L |
|---|---|---|---|
| Track Pitch = 0.32 um, RUB size = 1932'498=962136 bits, pi = 3.141592 | | | |
| Data Zone | 24~58 mm | 24~58 mm | 24~58 mm |
| Channel bit length | 74.50 nm | 58.20 nm | 55.80 nm |
| Data Zone Capacity | 381856 RUBs(=25.025GB) | 488802 RUBs(=32.034GB) | 509826 RUBs(=33.412GB) |

FIG. 5

| Data Frame | Byte position in Data Frame | Contents | Number of bytes | |
|---|---|---|---|---|
| 0 | 0 | SBM Header | 24 | |
| 0 | 25 | Reserved | 40 | |
| 0 | 64 | Bitmap Data | 15872+ M*2048 | |
| .. | .. | .. | .. | |
| M+1 | 0 | Set to 00h | 2048 | |
| .. | .. | Set to 00h | 2048 | 15872+30*2048*8 |
| 30 | 0 | Set to 00h | 2048 | = 507392 bits |

INFORMATION STORAGE MEDIUM, RECORDING AND REPRODUCING APPARATUS, AND RECORDING AND REPRODUCING METHOD

CROSS-REFERENCE TO RELATED PATENT APPLICATIONS

This application claims priority from U.S. Provisional Application No. 61/272,716, filed on Oct. 26, 2009 in the U.S. Patent and Trademark Office, and Korean Patent Application No. 10-2010-0055647, filed on Jun. 11, 2010 in the Korean Intellectual Property Office, the disclosures of which are incorporated herein in their entirety by reference.

BACKGROUND

1. Field

Apparatuses and methods consistent with exemplary embodiments relate to a computer-readable storage medium, and more particularly, to a computer-readable storage medium, a recording and reproducing apparatus, and a recording and reproducing method for efficiently managing a space bitmap.

2. Description of the Related Art

Various methods, such as a high density method and a multi-layer method, are being developed for high capacity or massive information transmission through an information storage medium or a wired or wireless network. Generally, high capacity is achieved by using a high density per layer method and a multi-layer method at the same time. Accordingly, a method of efficiently managing disc management information increased due to the high density per layer method and/or multi-layer method is required.

For example, a physical standard of a current Blu-ray disc suggests two types, i.e., a single layer and a dual layer, in recording at a density of 25 GB per layer. When a Blu-ray disc of a triple layer or a quadruple layer between 30 GB to 40 GB per layer is produced for high capacity, an amount of disc management information for managing the Blu-ray disc is increased according to the increase in the capacity of the Blu-ray disc. When a recording status of recording and reproducing unit blocks of a user data area is indicated in a bitmap, the amount of the disc management information is increased as much as the increase in a number of the recording and reproducing unit blocks of the user data area.

A method of effectively representing the recording status of the recording and reproducing unit blocks, and a method of distinguishing a previously determined space bitmap and an additional space bitmap are required when all of the recording and reproducing unit blocks of the user data area are unable to be indicated in the previously determined space bitmap due to the increase in the number of the recording and reproducing unit blocks of the user data area according to high capacity of a medium.

SUMMARY

Exemplary embodiments provides a computer-readable storage medium, an apparatus, and a method that record information about an additional space bitmap assigned when recording and reproducing unit blocks of a user data area are unable to be indicated in a predetermined space bitmap, and distinguish the determined space bitmap and the additional space bitmap.

According to an aspect of an exemplary embodiments, there is provided a computer-readable storage medium includes: a user data area that has user data recorded thereon; and a temporary disc management area that has a space bitmap indicating a recording status of recording and reproducing unit blocks of the user data area recorded thereon, where the space bitmap includes header information for distinguishing an additional space bitmap from the space bitmap and where the additional space bitmap is assigned when a space provided for the space bitmap is insufficient to represent the recording status of the recording and reproducing unit blocks of the user data area.

The header information may include start address information of the user data area indicated by a corresponding space bitmap so as to distinguish the additional space bitmap from the space bitmap.

The start address information in the header information of the additional space bitmap may differ according to a capacity of the user data area indicated by the space bitmap.

According to an aspect of another exemplary embodiment, there is provided an apparatus for recording data on a computer-readable storage medium, the apparatus comprising: a pickup unit which emits or receives a light so as to transfer data to the computer readable recording medium, which includes a user data area that has user data recorded thereon, and a temporary disc management area that has a space bitmap indicating a recording status of recording and reproducing unit blocks of the user data area recorded thereon; and a controller which controls the pickup unit to record the space bitmap including header information for distinguishing an additional space bitmap from the space bitmap, where the additional space bitmap is assigned when a space provided for the space bitmap is insufficient to represent the recording status of the recording and reproducing unit blocks of the user data area.

According to an aspect of another exemplary embodiment, there is provided an apparatus for reproducing data from a computer-readable storage medium, the apparatus comprising: a pickup unit which emits or receives a light so as to transfer data to the computer-readable storage medium, which includes a user data area that has user data recorded thereon, and a temporary disc management area that has a space bitmap indicating a recording status of recording and reproducing unit blocks of the user data area recorded thereon; and a controller which controls the pickup unit to read header information for distinguishing an additional space bitmap from the space bitmap, where the additional space bitmap is assigned when a space provided for the space bitmap is insufficient to represent the recording status of the recording and reproducing unit blocks of the user data area.

According to an aspect of another exemplary embodiment, there is provided a method of recording data on a computer-readable storage medium that includes a user data area that has user data recorded thereon, and a temporary disc management area that has a space bitmap indicating a recording status of recording and reproducing unit blocks of the user data area recorded thereon, the method includes: recording the space bitmap including header information for distinguishing an additional space bitmap from the space bitmap, where the additional space bitmap is assigned when a space provided for the space bitmap is insufficient to represent the recording status of the recording and reproducing unit blocks of the user data area.

According to an aspect of another exemplary embodiment, there is provided a method of reproducing data from a computer-readable storage medium that includes a user data area that has user data recorded thereon, and a temporary disc management area that has a space bitmap indicating a recording status of recording and reproducing unit blocks of the user data area recorded thereon. The method includes reproducing header information for distinguishing an additional space bitmap from the space bitmap, where the additional space bitmap is assigned when a space provided for the space bitmap is insufficient to represent the recording status of the recording and reproducing unit blocks of the user data area.

BRIEF DESCRIPTION OF THE DRAWINGS

The above and/or other aspects will become more apparent by describing in detail exemplary embodiments with reference to the attached drawings in which:

FIG. 3 is a table illustrating disc parameters according to capacity per layer according to an exemplary embodiment;

FIG. 5 is a diagram illustrating a space bit map (SBM) format according to an exemplary embodiment;

DETAILED DESCRIPTION OF EXEMPLARY EMBODIMENTS

Hereinafter, exemplary embodiments will be described more fully with reference to the accompanying drawings.

Figure 1:
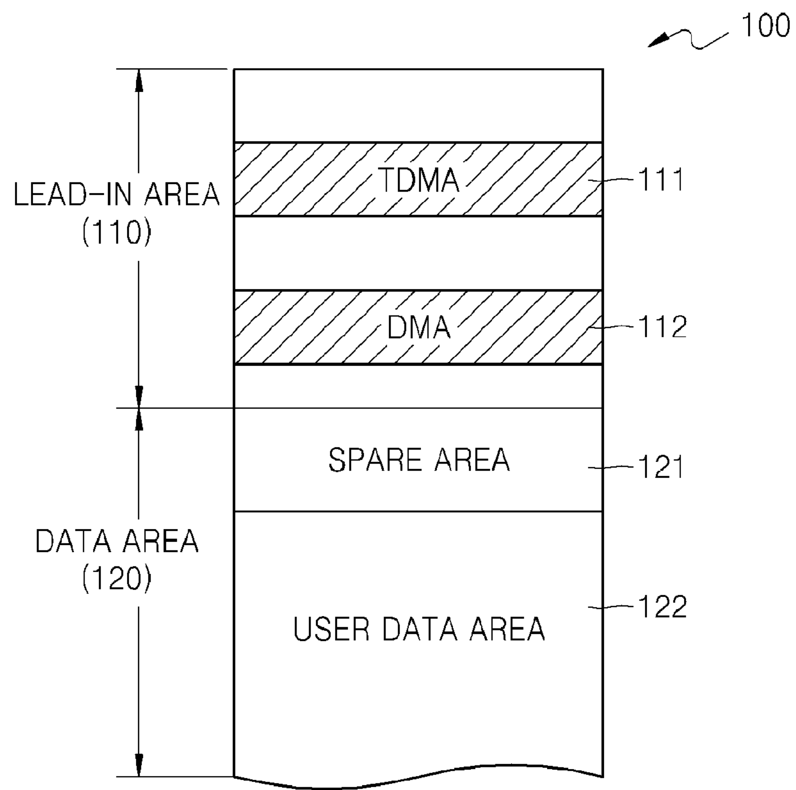
FIG. 1 is a diagram illustrating a schematic layout of a disc according to an exemplary embodiment.

FIG. 1 is a diagram illustrating a schematic layout of a disc 100 according to an exemplary embodiment.

Referring to FIG. 1, the disc 100 includes a lead-in area 110 and a data area 120.

The lead-in area 110 includes a temporary disc management area (TDMA) 111 and a disc management area (DMA) 112.

The TDMA 111 is an area for recording disc management information for defect management or a logical overwrite, and recording management information according to a recording method.

The DMA 112 is an area for recording final disc management information recorded on the TDMA 111, during finalization of the disc 100.

The data area 120 includes a spare area 121 and a user data area 122.

The user data area 122 is an area for recording user data in recording and reproducing unit blocks.

The spare area 121 is an area for recording a replacement block for replacing a defective block when a defective block is detected in the user data area 122, or a replacement block for updating a data block of the user data area 122 via a logical overwrite.

The layout of the disc 100 is not limited to FIG. 1, and FIG. 1 is only an exemplary embodiment of the disc 100. For example, the lead-in area 110 may further include other areas for recording disc information. Also, the data area 120 may include another spare area, and such a disc 100 may include at least one recording layer.

Figure 2:
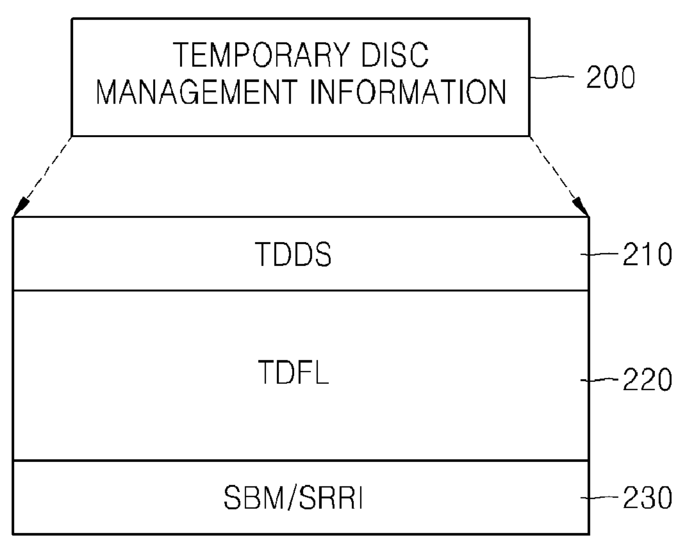
FIG. 2 is a diagram illustrating temporary disc management information recorded on a temporary disc management area (TDMA) of FIG. 1, according to an exemplary embodiment.

FIG. 2 is a diagram illustrating temporary disc management information (TDMI) 200 to be recorded on the TDMA 111 of FIG. 1, according to an exemplary embodiment.

Referring to FIG. 2, the TDMI 200 includes a temporary disc definition structure (TDDS) 210, a temporary defect list (TDFL) 220, and a space bitmap/sequential recording range information (SBM/SRRI) 230.

The TDFL 220 includes information about an original block and a replacement block, when the original block is to be replaced due to a logical overwrite or a defect generated in the user data area 122. The TDFL 220 includes at least one defect list entry, and each defect list entry may include location information of an original block and location information of a replacement block.

The TDDS 210 includes information for managing the disc 100 or information for managing the TDFL 220. For example, the TDDS 210 includes location information of the TDFL 220.

The SBM/SRRI 230 includes recording management information for representing a recording status of the user data area 122. When a recording method is a random recording method, SBM information indicating a recording status of each recording and reproducing unit block of the user data area 122 in a bit is recorded, and when the recording method is a sequential recording method, SRRI is recorded.

The TDMI 200 of FIG. 2 is only an exemplary embodiment, and thus the TDMI 200 may include a TDDS, a TDFL, and an SBM, or may include a TDDS and an SBM, wherein a TDFL is separately recorded.

FIG. 3 is a table illustrating disc parameters according to capacity per layer according to an exemplary embodiment.

Referring to FIG. 3, data zone capacity of a disc having 25 GB per layer is 381856 recording unit blocks (RUB), data zone capacity of a disc having 32 GB per layer is 488802 RUBs, and data zone capacity of a disc having 33.4 GB per layer is 509826 RUBs. Generally, since a RUB for recording data on a disc is also a reproducing unit block, a RUB is also referred to as a recording and reproducing unit block.

Exemplary embodiments described hereinafter use the following examples.

A size of user data contained in a recording and reproducing unit block is 64 KB (=32 sectors).

TDMI includes a TDDS of one sector, a TDFL of (32×number of disc layers−1 sectors) sectors, and an SBM/SRRI of 31 sectors.

SBMs include an SBM corresponding to each layer. In other words, when there are 3 layers, SBMs include an SBM0, an SBM1, and an SBM2, and each of the SBM0, the SBM1, and the SBM2 is recorded with a TDDS.

In a random recording mode, a TDDS and an SBM are recorded together on a TDMA, and here, the TDDS and the SBM may be recorded in one recording and reproducing unit block by setting a size of the TDDS to 1 sector and a size of the SBM to 31 sectors.

The SBM includes 64 bytes as header information and indicates bitmap data with remaining bytes. Here, a number of indicatable recording and reproducing unit blocks is 8 (bits)×(31 (sectors)×2048 (2 kilobytes)−64 (bytes))=507392. In other words, when one sector is 2 KB, 31 sectors constituting capacity of the SBM is 31×2048 (=2 KB) bytes. When 64 bytes of the header information is subtracted, (31×2048−64) bytes remain. Since one bit indicates recording of one recording and reproducing unit block in the SBM, 8×(31×2048−64) bits indicate a status of 8×(31×2048−64) recording and reproducing unit blocks, and thus 8×(31×2048−64) recording and reproducing unit blocks are indicated with one SBM. Accordingly, as shown in the disc parameters of FIG. 3, a data zone is not entirely indicated in a bitmap in case of 33.4 GB/L (when a spare area is not assigned to a data zone, the data zone is a user data area).

Accordingly, when all of the recording and reproducing blocks of a user data area cannot be indicated in a predetermined SBM, a spare area of at least 2434=509826−507392 blocks is assigned for each layer, so that each layer may be indicated with a single SBM. Thus, the size of the SBM corresponding to each layer becomes 31 sectors to be recorded as one block with a TDDS.

Figure 4A:
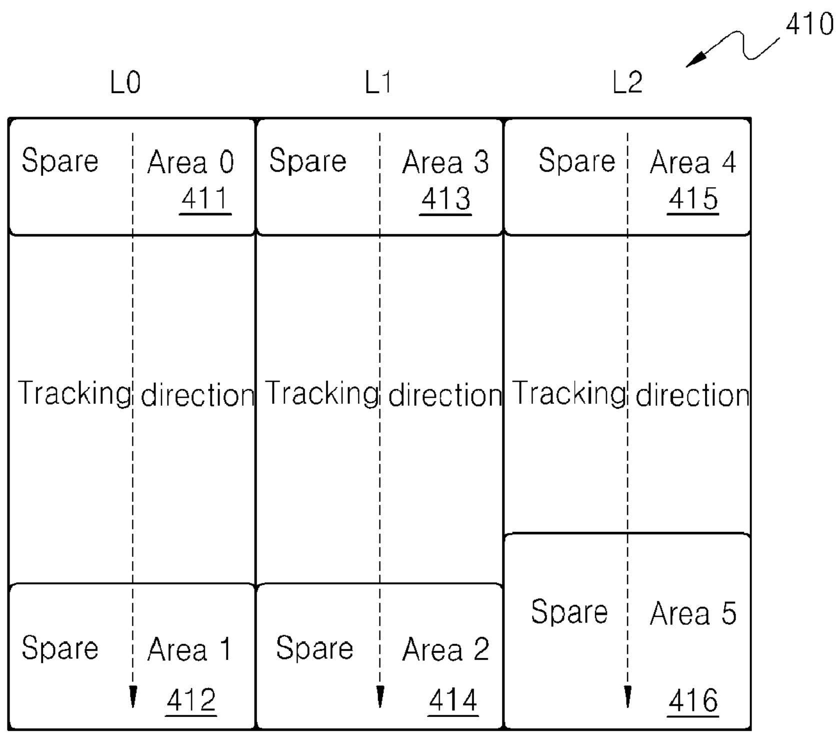
FIGS. 4A and 4B are diagrams illustrating information storage media of three layers and four layers, respectively, where a spare area is assigned to each layer according to an exemplary embodiment.
Figure 4B:
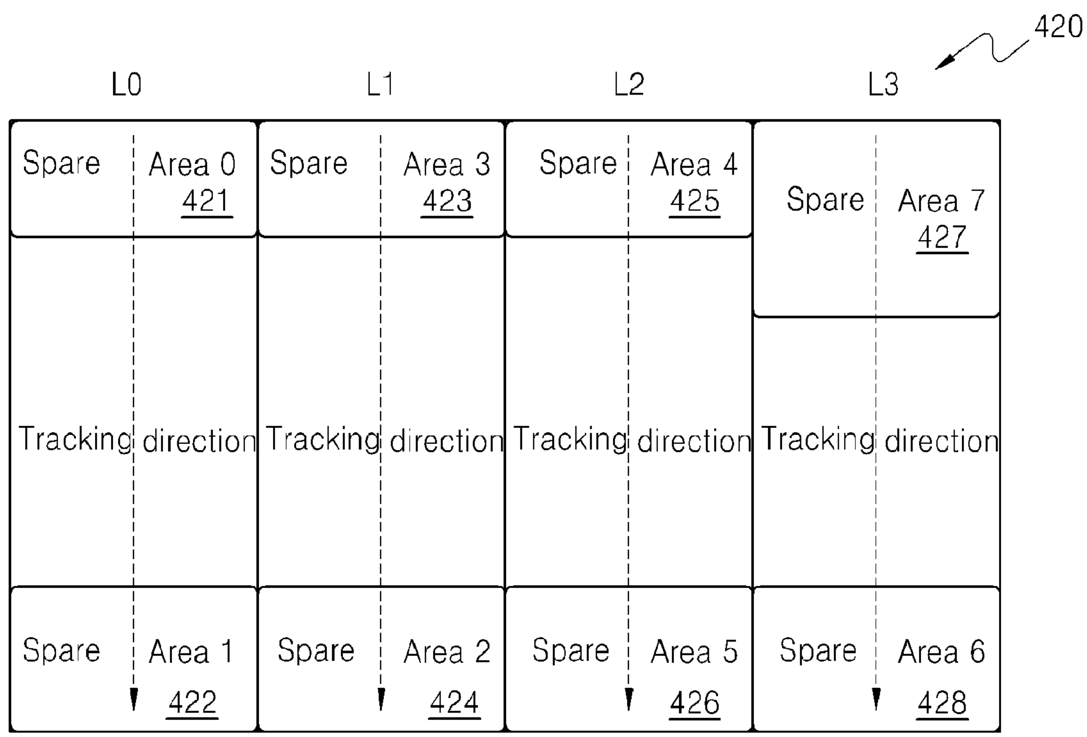

FIGS. 4A and 4B are diagrams illustrating information storage media of three layers and four layers, respectively, where a spare area is assigned to each layer as described above. Here, $SA_n$_size+$SA_{n+1}$_size>=2434, (in detail, powers of 2) ($SA_n$_size represents a size of $SA_n$), and 4096≦$SA_n$_size+$SA_{n+1}$_size (n=0, 2, 4, and 6) are satisfied since assigning of a spare area according to the above exemplary method is mandatory.

In detail, in a sequential recording mode, assignment of a spare area is optional. In other words, the size of a spare area may be 0.

In a random recording mode, assignment of a spare area is mandatory. In other words, at least one spare area having a non-zero size needs to be assigned to a disc, and a size of the spare area, assigned to each layer, is at least a predetermined size, such as 4096. Here, the predetermined size denotes a number of remaining blocks of the user data area that is unable to be indicated in a given SBM format.

In more detail, assignment of a spare area to an inner perimeter of a disc is mandatory, and a size of the spare area is fixed or at least a predetermined size, such as 4096. In other words, in 3 layers shown in FIG. 4A, a Spare Area 0 411, a Spare Area 3 413, and a Spare Area 4 415 are mandatory, and in 4 layers shown in FIG. 4B, a Spare Area 0 421, a Spare Area 3 423, a Spare Area 4 425, and a Spare Area 7 427 are mandatory, where a size of each of the spare area is fixed to 4096 or above. Alternatively, assignment of a spare area to an outer perimeter of the disc may be mandatory, and the size of the spare area may be fixed or at least a predetermined size, such as 4096.

FIG. 5 is a diagram illustrating an SBM format according to an exemplary embodiment.

Referring to FIG. 5, the SBM format includes an SBM header and bitmap data.

When all of the recording and reproducing unit blocks of a user data area are unable to be indicated in a predetermined SBM, a following method may be used.

For example, as described above, when all of the recording and reproducing unit blocks of the user data area are unable to be represented in an SBM of 31 sectors, e.g., in the case of 33.4 GB per layer, the recording and reproducing unit blocks are indicated as much as possible with the SBM of 31 sectors, and a bitmap of remaining blocks (509826−507392=2434 blocks) is recorded in thee disc management information, such as a TDDS or a TDFL (2434 bits=304.25 bytes are required if indicated in bitmap data). However, such an additional bitmap is not limited to a TDDS and a TDFL, and the recording and reproducing unit blocks may be stored in any area of a disc.

Figure 6:
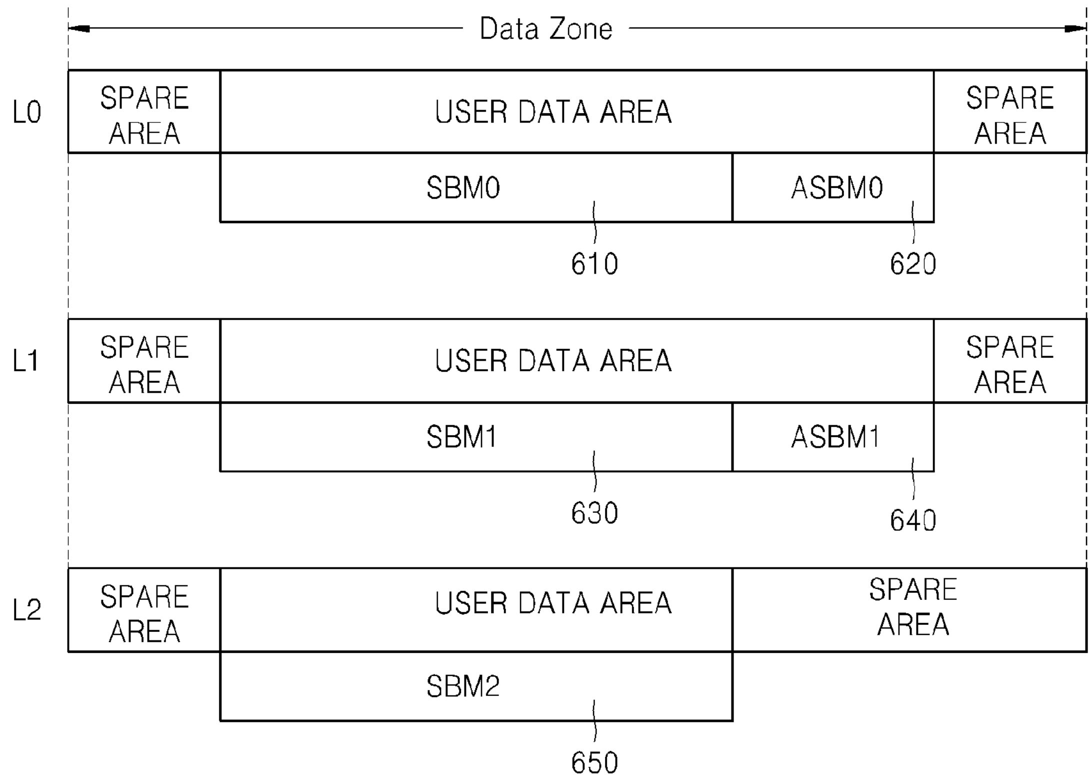
FIG. 6 is a reference diagram illustrating an additional bitmap according to an exemplary embodiment.

FIG. 6 is a reference diagram illustrating an additional bitmap according to an exemplary embodiment.

Referring to FIG. 6, a disc includes layers, i.e., layers L0, L1, and L2, where a data area of each of the layers L0 through L2 includes two spare areas and one user data area.

A recording status of recording and reproducing unit blocks of a part of a user data area of the layer L0 is indicated by an SBM0 610, and a remaining part of the user data area that is not indicated by the SBM0 610 is indicated by an additional SBM (ASBM) 0 620.

Similarly, a recording status of recording and reproducing unit blocks of a part of a user data area of the layer L1 is indicated by an SBM1 630, and a remaining part of the user data area that is not indicated by the SBM1 630 is indicated by an ASBM1 640.

In the layer L2, since a recording status of recording and reproducing unit blocks of a user data area of the layer L2 is fully indicated in an SBM2 650, an ASBM is not prepared.

Since a TDDS includes location information regarding where an SBM is recorded in each layer, and the TDDS is updated when the SBM is updated, an update may be easily performed if additional bitmap data is stored and recorded in the TDDS.

Figure 7:
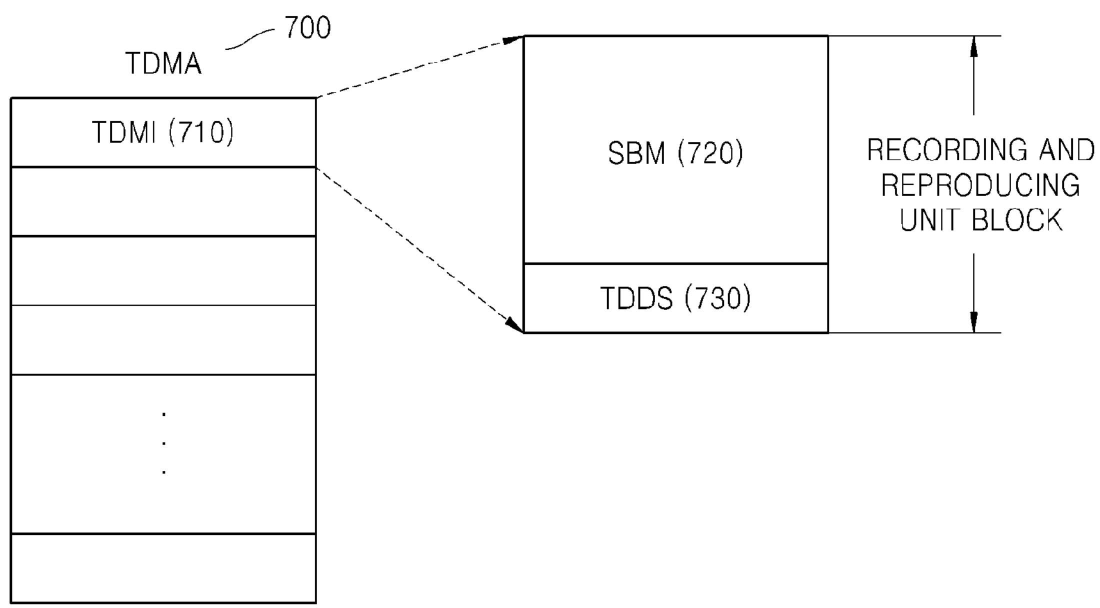
FIG. 7 is a diagram illustrating a TDMA according to an exemplary embodiment.

FIG. 7 is a diagram illustrating a TDMA 700 according to an exemplary embodiment.

Referring to FIG. 7, in the TDMA 700, one piece of TDMI 710 is recorded in one recording and reproducing unit block. The TDMI 710 includes an SBM 720 and a TDDS 730. In FIG. 7, the TDMI 710 including the SBM 720 and the TDDS 730 is recorded in one recording and reproducing unit block, but alternatively, the TDMI 710 may be recorded in at least two recording and reproducing unit blocks.

Figure 8:
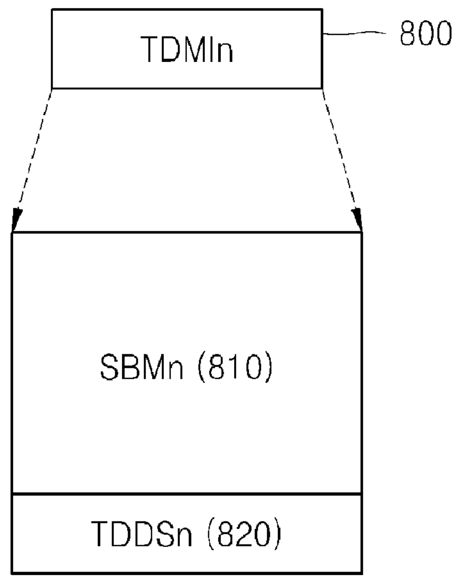
FIG. 8 is a diagram illustrating a TDMIn recorded on an n-th layer, according to an exemplary embodiment.

FIG. 8 is a diagram illustrating TDMIn 800 recorded on an n-th layer, according to an exemplary embodiment.

Referring to FIG. 8, the TDMIn 800 includes an SBMn 810 and a TDDSn 820.

Bitmap data about remaining user data blocks of the n-th layer not indicated in the SBMn 810 is indicated in the TDDSn 820.

Since the SBMn 810 and the TDDSn 820 are recorded in the same block, the bitmap data about the remaining user data blocks is obtained from the TDDSn 820 in the same block including the SBMn 810 while accessing the SBMn 810 from a final TDDS, and thus all of bitmap data about the n-layer is obtained from the TDMIn 800.

As described above, all of the user data areas of an n-th layer may be indicated or not indicated in an SBMn of 31 sectors based on how a spare area is assigned to a data area of a disc, e.g., according to a size of an assigned spare area. Accordingly, if all user data areas of the n-th layer are not indicated in the SBMn, ASBM flag information may be included in the SBMn so as to indicate that there is additional bitmap data. For example, the ASBM flag information may be stored in a header of the SBMn, and when a set value of the ASBM flag information is 0, an ASBMn may not exist since all user data areas of the n-th layer are indicated in the SBMn. Alternatively, when the set value is 1, the user data areas of the n-th layer are too large to all be indicated in the SBMn, and thus bitmap data about remaining user data areas that are not indicated in the SBMn is indicated in the ASBMn. When the SBMn and TDDSn form one block to be recorded, the ASBM flag information is stored in the TDDSn if the ASBM flag information indicates existence of the ASBMn in the header of the SBMn.

For example, when SBMs of three layers need to be updated in a disc having three layers, and an update is performed in an order of an SBM0, an SBM1, and an SBM2, blocks may be recorded in an order of SBM0+TDDS0, SBM1+TDDS1, and SBM2+TDDS2. Here, points indicating locations of where the SBM0, the SBM1, and the SBM2 are finally recorded are recorded in the TDDS2 of the last block, and the SBM0, the SBM1, and the SBM2 are obtained from the TDDS2. Here, an ASBM may be required or not required according to a size of a spare area assigned to each layer. Here, a controller of a drive may determine whether the ASBM is required based on assignment information of a spare area stored in a TDDS, or may determine existence of the ASBM of a corresponding layer based on an SBM of each layer and, if the ASBM exists, obtain the ASBM from the TDDS recorded with the SBM and bitmap data about the corresponding layer. When the ASBM is required while the blocks are recorded in the order of SBM0+TDDS0, SBM1+TDDS1, and SBM2+TDDS2, TDDS0 stores an ASBM0, TDDS1 stores an ASBM1, and TDDS2 stores an ASBM2. Since sizes of spare areas assigned to each layer may be different from each other, a size of a required ASBM may be different according to layers. Accordingly, a starting and ending location of an ASBM in a TDDS, the starting location and bitmap length information, or the bitmap length information and the ending location may be stored in an SBM, or a maximum size of a required ASBM may be assigned in a fixed location in the TDDS.

Also, each SBMn includes start address information of a user data area indicated by bitmap data of an ASBMn, and length information of the bitmap data. Alternatively, the start address information and the length information may be stored in the ASBMn. During finalization of a disc, SBMn+TDDSn is recorded on a DMA as SBMn+DDSn, and the DDSn stores information about the ASBMn, like the TDDSn.

A method of assigning an ASBM in a separate cluster or a recording and reproducing unit block, instead of a TDDS, according to an exemplary embodiment will now be described.

Figure 9A:
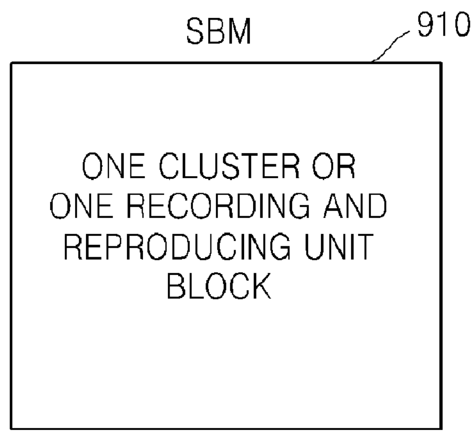
FIGS. 9A and 9B are reference diagrams illustrating an SBM and an additional SBM (ASBM) generated in a separate cluster or a separate recording and reproducing unit block, according to an exemplary embodiment.
Figure 9B:
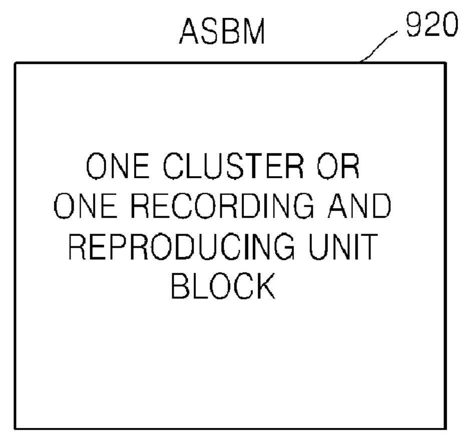

FIGS. 9A and 9B are reference diagrams illustrating an SBM 910 and an ASBM 920 generated in a separate cluster or a separate recording and reproducing unit block, according to an exemplary embodiment.

Referring to FIG. 9A, the SBM 910 is in one cluster or one recording and reproducing unit block, and the SBM 910 indicates a recording status of a user data area in a recording and reproducing unit block. Here, if the recording status of the recording and reproducing unit blocks in the user data area is not all indicated in the SBM 910, the recording status of the recording and reproducing unit blocks is also indicated in the ASBM 920 in FIG. 9B by using another cluster or another recording and reproducing unit block.

As such, if the ASBM 920 is indicated in the separate cluster or the separate recording and reproducing unit block, an SBM cluster and an ASBM cluster exist together in a disc, and thus it is required to distinguish the SBM cluster and the ASBM cluster.

Four of the following exemplary methods may be used to distinguish the SBM cluster and the ASBM cluster.

First, different version numbers may be assigned to an SBM and an ASBM by using a version number filed in SBM header information.

Second, different sequence numbers may be assigned to an SBM and an ASBM by using a "sequence number in layer" field in SBM header information.

Third, different values may be assigned to an SBM and an ASBM by using a "Start PSN" field of a bitmap in SBM header information.

Fourth, different values may be assigned to an SBM and an ASBM by using a "continuation flag" field in SBM header information or another area of the SBM.

Figure 10:
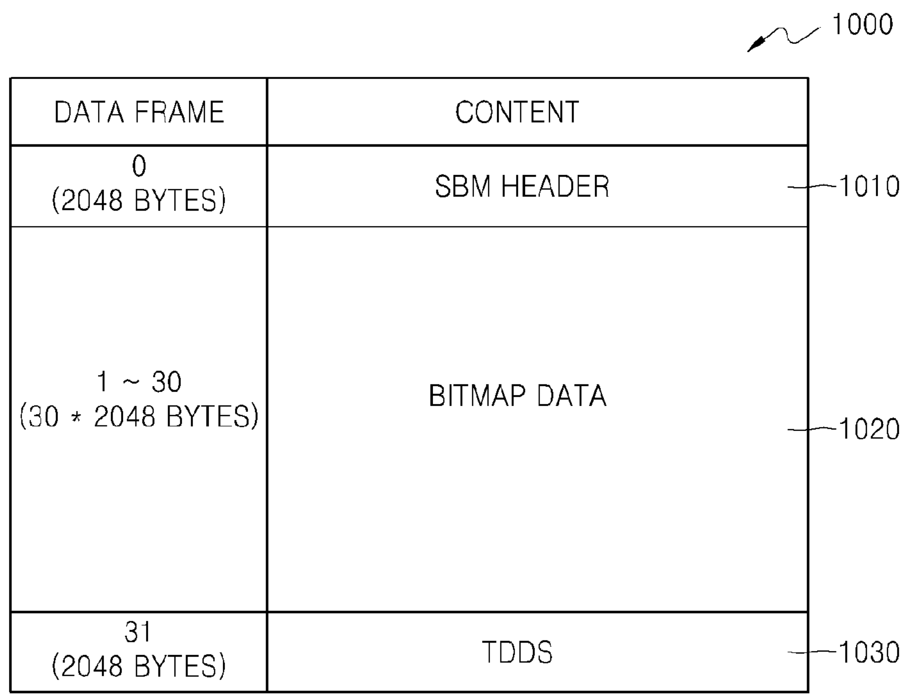
FIG. 10 is a diagram illustrating a basic format of an SBM, according to an exemplary embodiment.

FIG. 10 is a diagram illustrating a basic format of an SBM, according to an exemplary embodiment.

Referring to FIG. 10, an SBM format 1000 includes an SBM header 1010 in a data frame 0, bitmap data 1020 from data frames 1 to 30, and a TDDS 1030 in a data frame 31.

The SBM format 1000 of FIG. 10 includes flag information indicating existence of an ASBMn according to a size of a user data area of each layer. In other words, when it is possible to cover the size of the user data area of a corresponding layer with an SBM of one recording and reproducing unit block, a value of a corresponding ASBMn flag is set to a predetermined value, such as 0, so as to indicate that the ASBMn is not required in the corresponding layer, the ASBMn is not recorded on a disc as it is not required, or it is sufficient to indicate a bitmap of the corresponding layer in one recording and reproducing unit block.

Formats of an SBM and an ASBM are the same. The ASBM and the SBM are not different from each other, and ASBM is named to indicate another recording and reproducing unit block using the format of the SBM for an additional bitmap that is not indicated in one recording and reproducing unit block in one layer.

Figure 11A:
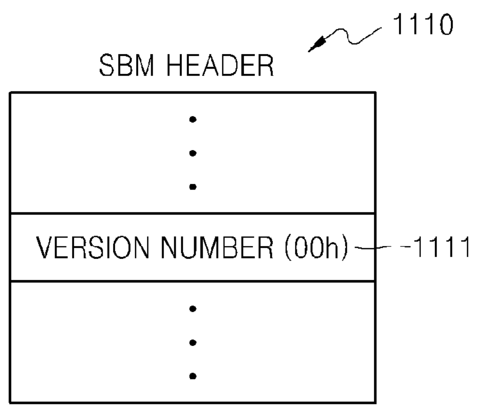
FIGS. 11A and 11B are diagrams illustrating SBM header information changed to classify an SBM and an ASBM, according to an exemplary embodiment.
Figure 11B:
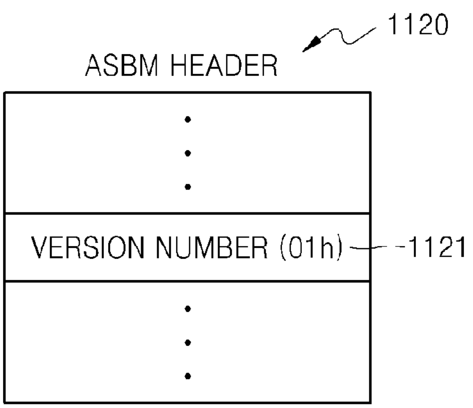

FIGS. 11A and 11B are diagrams illustrating SBM header information changed to classify an SBM and an ASBM, according to an exemplary embodiment.

FIG. 11A shows an SBM header 1110, and FIG. 11B shows an ASBM header 1120. The SBM header 1110 and the ASBM header 1120 respectively have version number fields 1111 and 1121, and so as to distinguish the SBM and the ASBM, values of the version number fields 1111 and 1121 respectively of the SBM header 1110 and the ASBM header 1120 are differently set. Referring to FIGS. 11A and 11B, in order to distinguish the SBM header 1110 and the ASBM header 1120, "0h" is set for the version number field 1111 and "1h" is set for the version number field 1121.

Figure 12A:
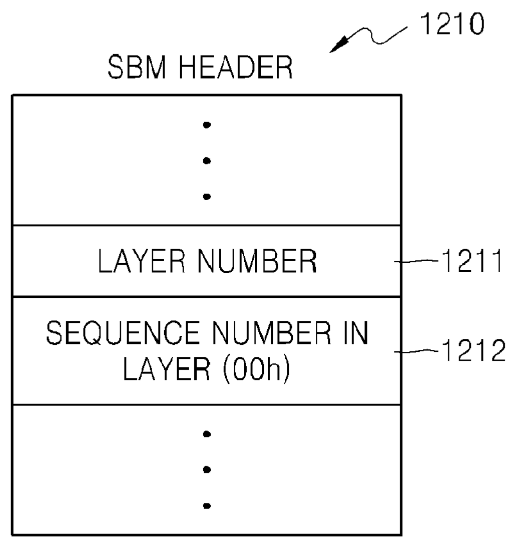
FIGS. 12A and 12B are diagrams illustrating SBM header information changed to classify an SBM and an ASBM, according to another exemplary embodiment.
Figure 12B:
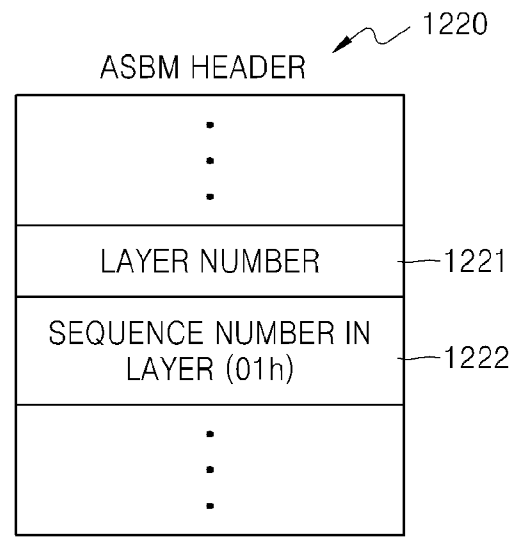

FIGS. 12A and 12B are diagrams illustrating SBM header information changed to classify an SBM and an ASBM, according to another exemplary embodiment.

FIG. 12A shows an SBM header 1210, and FIG. 12B shows an ASBM header 1220. The SBM header 1210 and the ASBM header 1220, respectively, have layer number fields 1211 and 1221, and sequence number in layer fields 1212 and 1222, and so as to distinguish the SBM and the ASBM, values of the sequence number in layer fields 1212 and 1222 respectively of the SBM header 1210 and the ASBM header 1220 are differently set. Referring to FIGS. 12A and 12B, in order to distinguish the SBM header 1210 and the ASBM header 1220, "0h" is set for the sequence number in layer field 1212 and "1h" is set for the sequence number in layer field 1222.

Figure 13A:
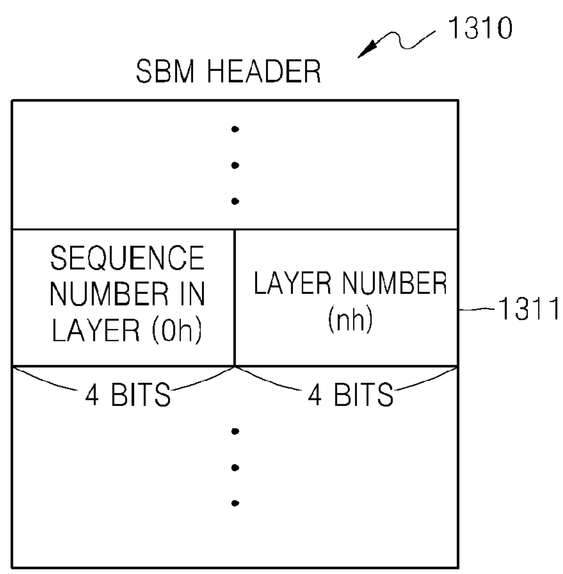
FIGS. 13A and 13B are diagrams illustrating SBM header information changed to classify an SBM and an ASBM, according to another exemplary embodiment.
Figure 13B:
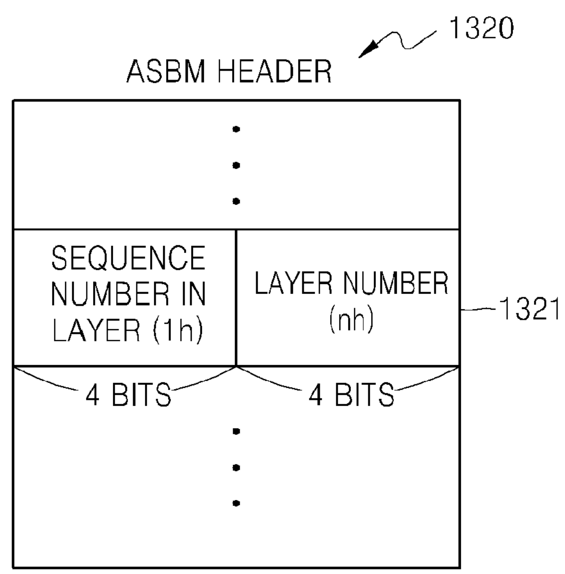

FIGS. 13A and 13B are diagrams illustrating SBM header information changed to distinguish an SBM and an ASBM, according to another exemplary embodiment.

FIG. 13A shows an exemplary SBM header 1310, and FIG. 13B shows an exemplary ASBM header 1320. The SBM header 1310 and the ASBM header 1320, respectively, have a sequence number in a layer and layer number fields 1311 and 1321, and so as to distinguish the SBM and the ASBM, values of the sequence number in layer and layer number fields 1311 and 1321 respectively of the SBM header 1310 and the ASBM header 1320 are differently set. A sequence number in the layer and layer number field is similar to a conventional layer number field, where a layer number indicated in the conventional layer number field is indicated in lower 4 bits, and information for distinguishing an SBM and an ASBM is indicated in upper 4 bits. Referring to FIGS. 13A and 13B, in order to distinguish the SBM header 1310 and the ASBM header 1320, "0h and nh" are set for the sequence number in the layer and the layer number field 1311, and "1h and nh" are set for the sequence number in the layer and layer number field 1321.

Figure 14A:
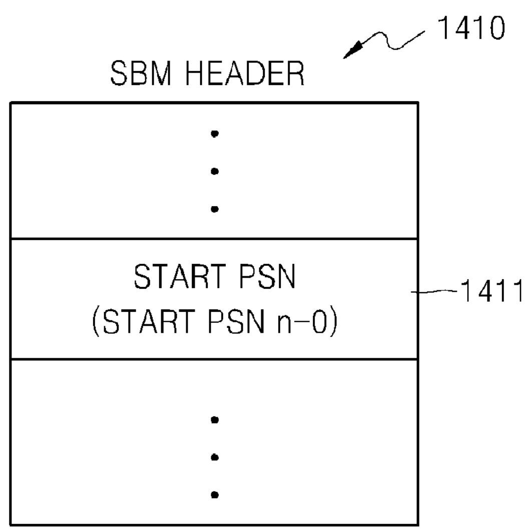
FIGS. 14A and 14B are diagrams illustrating SBM header information changed to classify an SBM and an ASBM, according to another exemplary embodiment.
Figure 14B:
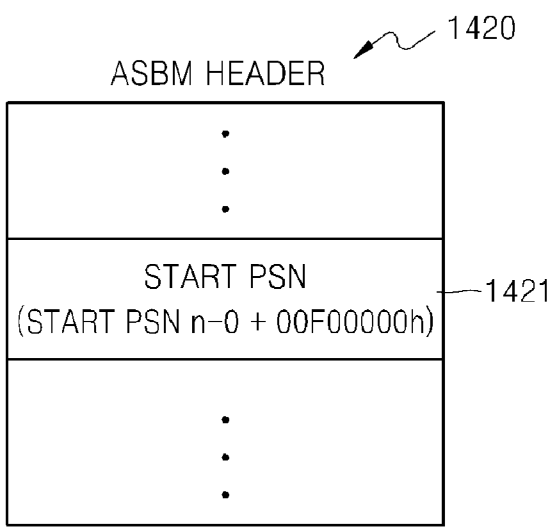

FIGS. 14A and 14B are diagrams illustrating SBM header information changed to classify an SBM and an ASBM, according to another exemplary embodiment.

FIG. 14A shows an exemplary SBM header 1410, and FIG. 14B shows an exemplary ASBM header 1420. The SBM header 1410 and the ASBM header 1420 respectively have start physical sector number (PSN) fields 1411 and 1421, and in order to distinguish the SBM and the ASBM, values of the start PSN fields 1411 and 1421, respectively, of the SBM header 1410 and the ASBM header 1420 are differently set. Referring to FIGS. 14A and 14B, "start PSN n−0" is set for the start PSN field 1411, and "start PSN n−0+00F00000h" is set for the start PSN field 1421.

Here, "start PSN n−0" and "start PSN n−0+00F00000h" are only examples, and other values may be used to set the start PSN fields 1411 and 1421.

Figure 15:
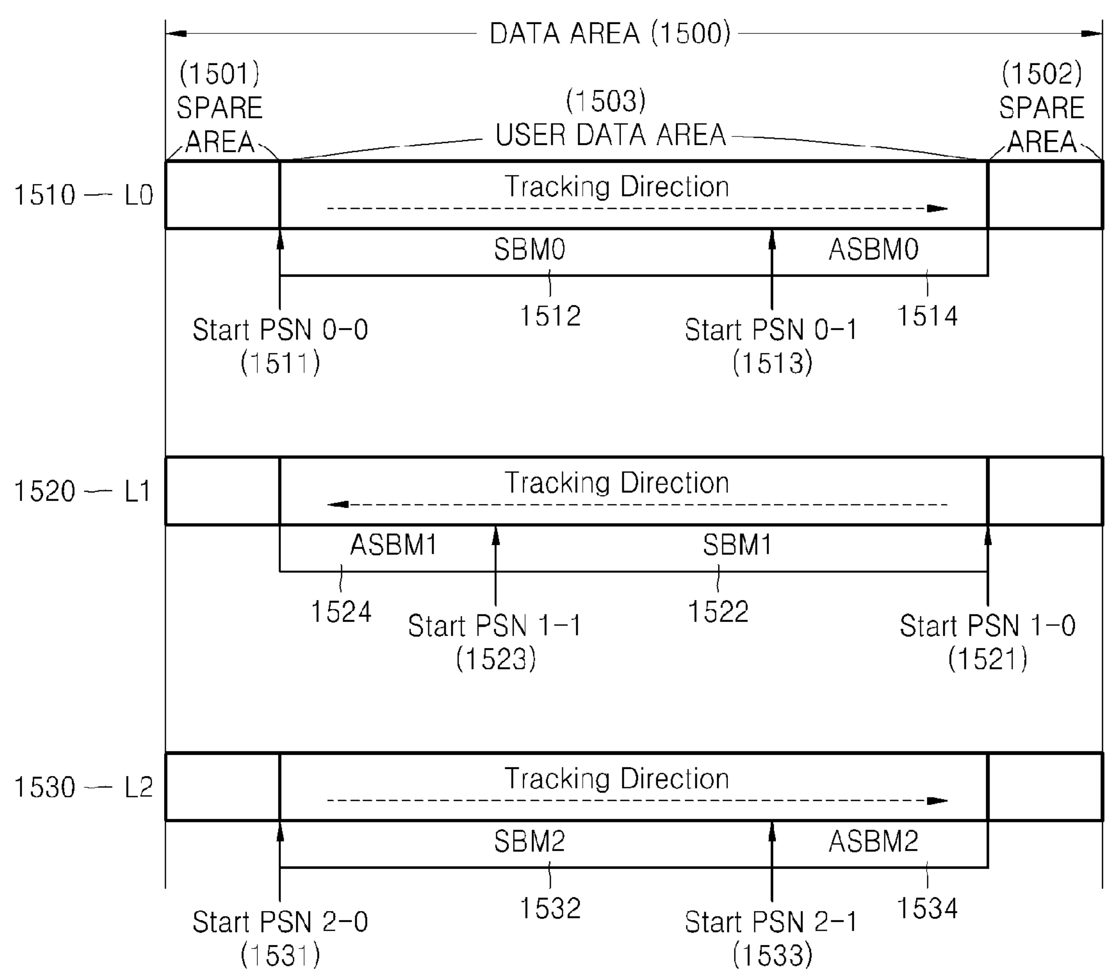
FIG. 15 is a diagram illustrating a disc layout for describing a start physical sector number (PSN) of an SBM and a start PSN of an ASBM according to another exemplary embodiment.

FIG. 15 is a diagram illustrating a disc layout for describing a start PSN of an SBM and a start PSN of an ASBM according to an exemplary embodiment.

The disc layout illustrated in FIG. 15 includes three recording layers, i.e., a layer L0 1510, a layer L1 1520, and a layer L2 1530, where each recording layer includes spare areas 1501 and 1502, and a user data area 1503 in a data area 1500.

In the layer L0 1510, a tracking direction goes from left to right, a start PSN of an SBM0 1512 is Start PSN 0-0 1511 constituting a first address of the user data area 1503 indicated by the SBM0 1512, and a start PSN of an ASBM0 1514 is Start PSN 0-1 1513 constituting a first address of the user data area 1503 indicated by the ASBM0 1514.

Similarly, in the layer L1 1520, a tracking direction goes from right to left, a start PSN of an SBM1 1522 is Start PSN 1-0 1521 constituting a first address of the user data area 1503 indicated by the SBM1 1522, and a start PSN of an ASBM1 1524 is Start PSN 1-1 1523 constituting the user data area 1503 indicated by the ASBM1 1524.

Also, in the layer L2 1530, a tracking direction goes from left to right, a PSN of an SBM2 1532 is Start PSN 2-0 1531 constituting a first address of the user data area 1503 indicated by the SBM2 1532, and a start PSN of an ASBM2 1534 is Start PSN 2-1 1533 constituting a first address of the user data area 1503 indicated by the ASBM2 1534.

In detail, in Start PSN n−0, a first PSN of a recording and reproducing unit block according to a tracking direction is set in a user data area of each layer, and accordingly, is set to Start PSN n−1=Start PSN n−0+"value obtained by changing maximum bitmap size indicatable by SBM format to PSN". Such a value may differ based on a size of a recording and reproducing unit block or a setting of a PSN, but may be as follows.

In the SBM format 1000 depicted in FIG. 10, since bitmap data has a maximum of 30 sectors, 30 (sectors)×2048 (bytes)×8 (bits)=491520 recording and reproducing unit blocks may be indicated. In other words, 491520 recording and reproducing unit blocks may be indicated by using 30 sectors of bitmap data. When the recording and reproducing unit blocks are each 64 KB (32 sectors), and each recording and reproducing unit block is changed to a PSN, the PSN is 491520×32=15728640 (=00 F0 00 00h). Thus, an offset value changed to the PSN is 00F00000h. Here, the above calculation is performed based on an assumption that a PSN sequentially increases in a tracking direction.

Figure 16A:
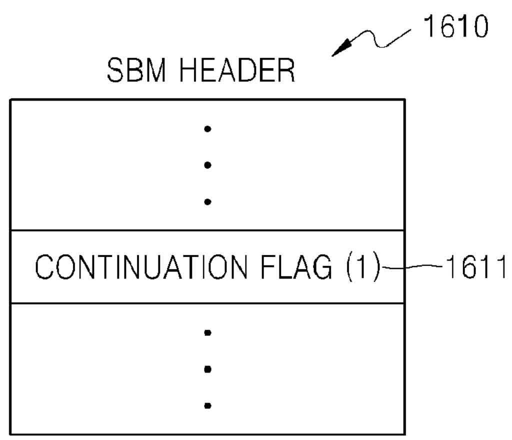
FIGS. 16A and 16B are diagrams illustrating SBM header information changed to classify an SBM and an ASBM, according to another exemplary embodiment.
Figure 16B:
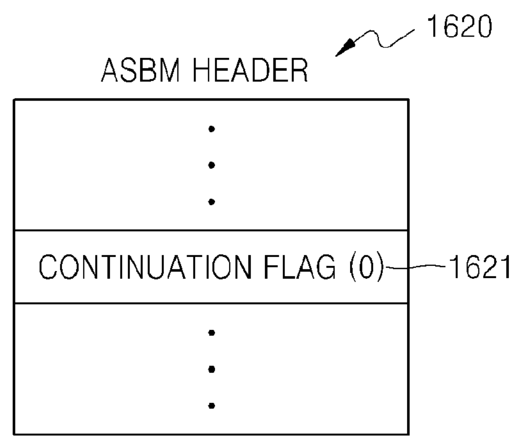

FIGS. 16A and 16B are diagrams illustrating SBM header information which is modified to distinguish an SBM and an ASBM, according to another exemplary embodiment.

FIG. 16A shows an exemplary SBM header 1610, and FIG. 16B shows an exemplary ASBM header 1620. The SMB header 1610 and the ASBM header 1620 respectively include continuation flag fields 1611 and 1621, and in order to distinguish the SBM and ASBM, values of the continuation flag fields 1611 and 1621 respectively of the SBM header 1610 and the ASBM header 1620 are differently set. Referring to FIGS. 16A and 16B, in order to distinguish the SBM header 1610 and the ASBM header 1620, "1" is set for the continuation flag 1611 and "0" is set for the continuation flag 1621.

A recording and reproducing apparatus and a recording and reproducing method according to exemplary embodiments will now be described with reference to FIGS. 17 through 20.

Figure 17:
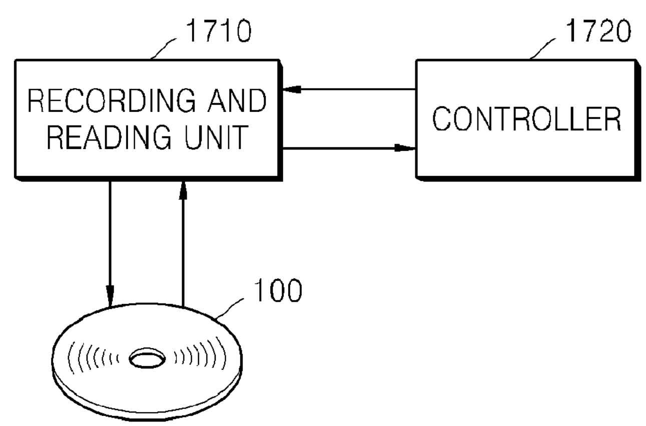
FIG. 17 is a schematic diagram illustrating a recording and reproducing apparatus according to an exemplary embodiment.
Figure 18:
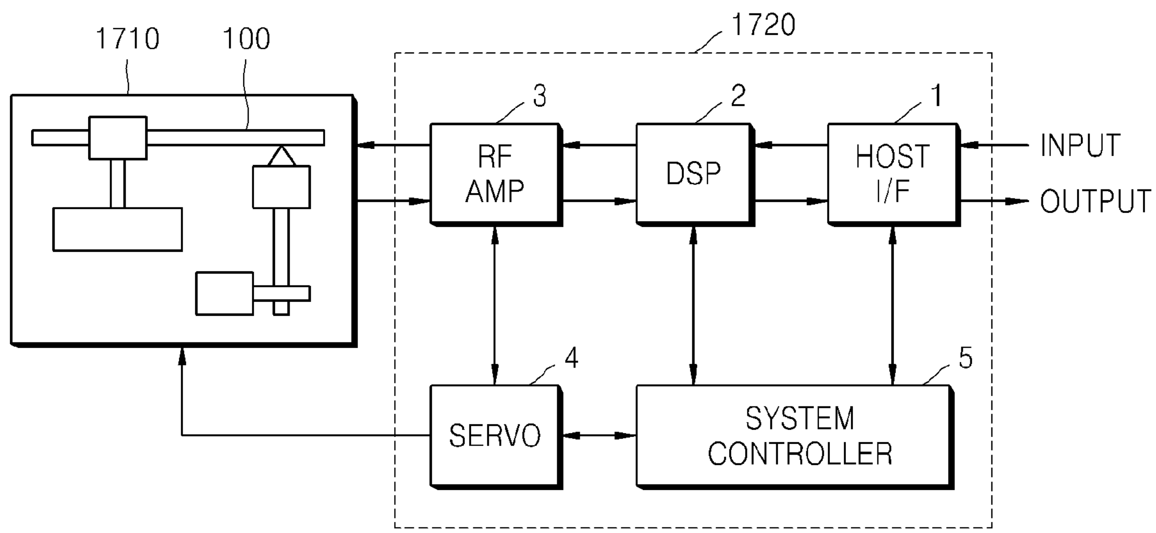
FIG. 18 is a block diagram illustrating a drive including the recording and reproducing apparatus of FIG. 17, according to an exemplary embodiment.
Figure 19:
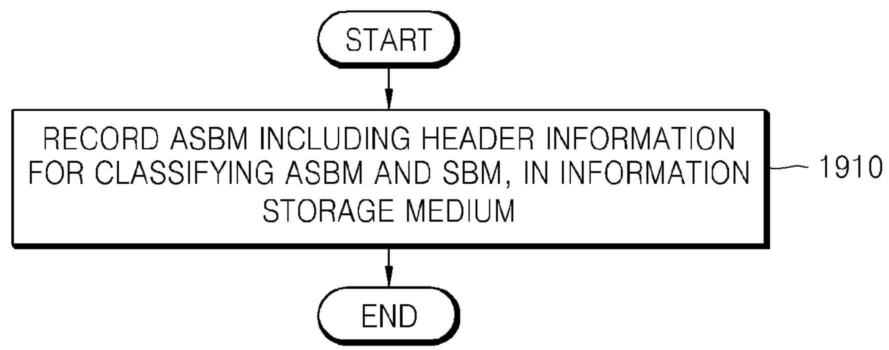
FIG. 19 is a flowchart illustrating a recording method according to an exemplary embodiment.
Figure 20:
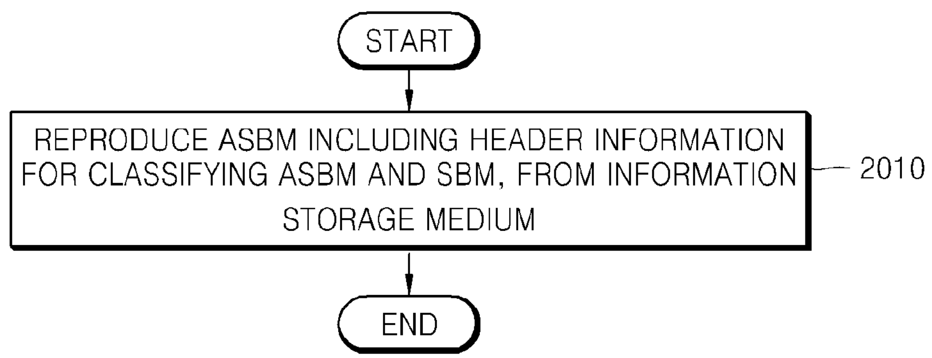
FIG. 20 is a flowchart illustrating a reproducing method according to an exemplary embodiment.

FIGS. 17 and 18 are block diagrams illustrating a recording and reproducing apparatus, FIG. 19 is a flowchart illustrating a recording method, and FIG. 20 is a flowchart illustrating a reproducing method, according to an exemplary embodiments.

FIG. 17 is a schematic diagram illustrating a recording and reproducing apparatus according to an exemplary embodiment.

Referring to FIG. 17, the recording and reproducing apparatus includes a recording and reading unit 1710, and a controller 1720.

An information storage medium i.e., a computer readable medium, e.g., the disc 100, includes a user data area on which user data is recorded, and a temporary disc management area on which an SBM indicating a recording status of recording and reproducing unit blocks of the user data area is recorded.

According to control of the controller 1720, the recording and reading unit 1710 records data on the disc 100 and reads data from the disc 100.

The controller 1720 controls the recording and reading unit 1710 to record or read data on or from the disc 100. Specifically, the controller 1720 controls the recording and reading unit 1710 to record the SBM including header information for distinguishing the ASBM from the SBM, where the ASBM is assigned when space of the SBM is insufficient to indicate the recording status of the recording and reproducing unit blocks of the user data area.

Also, the controller 1720 controls the recording and reading unit 1710 to read the header information for distinguishing the ASBM from the SBM, wherein the ASBM is assigned when the space of the SBM is insufficient to indicate the recording status of the recording and reproducing unit block of the user data area.

Here, in order to distinguish the ASBM and the SBM, the header information may include start address information of the user data area indicated by a corresponding SBM.

Start address information included in header information of the ASBM differs according to capacity of the user data area indicated by the SBM. In other words, the start address information included in the header information of the ASBM is obtained by adding the start address information included in the header information of the SBM and the capacity of the user data area indicated by the SBM.

The recording and reproducing apparatus may be realized in two apparatuses to separately perform recording and reproducing, or may be realized in one system as shown, for example, in FIG. 17.

FIG. 18 is a block diagram of a drive including the recording and reproducing apparatus of FIG. 17, according to an exemplary embodiment.

Referring to FIG. 18, the drive includes the recording and reading unit 1710 as a pickup unit. The disc 100 is loaded to the pickup unit. The pickup unit emits or receives a light to the disc 100 to transfer data with regard to the disc 100. Also, the drive includes a host interface (I/F) 1, a digital signal processor 2, a radio frequency amplifier (RF AMP) 3, a servo 4, and a system controller 5, as the controller 1720.

During recording, the host I/F 1 receives a recording command with data to be recorded, from a host (not shown). The system controller 5 performs initialization required for the recording. The DSP 2 performs error correction code (ECC) encoding by adding additional data, such as parity, to the data received from the host I/F 1 for error correction, and then modulates the ECC encoded data in a predetermined method. The RF AMP 3 converts data output from the DSP 2 to an RF signal. The recording and reading unit 1710 records the RF signal output from the RF AMP 3 on the disc 100. The servo 4 controls the recording and reading unit 1710 by receiving a command required for servo-control from the system controller 5.

Specifically, the system controller 5 controls the recording and reading unit 1710 to record an SBM including header information for distinguishing the ASBM from the SBM, where the ASBM is assigned when the space for the SBM is insufficient to indicate a recording status of recording and reproducing unit blocks of a user data area (refer to operation 1910 of FIG. 19).

During reproducing, the host I/F 1 receives a reproducing command from the host. The system controller 5 performs initialization required for reproducing. The recording and reading unit 1710 irradiates a laser beam on the disc 100, and receives the laser beam reflected from the disc 100 to output an optical signal. The RF AMP 3 changes the optical signal output from the recording and reading unit 1710 to an RF signal, and provides modulated data obtained from the RF signal to the DSP 2 while providing a servo signal obtained from the RF signal to the servo 4. The DSP 2 demodulates the modulated data, and outputs data obtained via ECC error correction. Meanwhile, the servo 4 performs servo control on the recording and reading unit 1710 by receiving the servo signal from the RF AMP 3 and a command required to control the recording and reading unit 1710 from the system controller 5. The host I/F 1 transmits data received from the DSP 2 to the host.

Specifically, the system controller 5 controls the recording and reading unit 1710 to read header information for distinguishing an ASBM and an SBM, wherein the ASBM is assigned when a space for the SBM is insufficient to indicate a recording status of recording and reproducing unit blocks of a user data area (refer to operation 2010 of FIG. 20).

Accordingly, when all of the recording and reproducing unit blocks of the user data area are unable to be indicated in a predetermined SBM due to increase of the number of recording and reproducing unit blocks according to a large capacity of a medium, a recording status of the increased number of recording and reproducing unit blocks may be indicated by efficiently assigning the ASBM, and the SBM and the ASBM may be effectively distinguished from the SBM.

Exemplary embodiments can also be embodied as computer readable codes on a computer-readable recording (storage) medium. The computer-readable recording (storage) medium is any non-transitory data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing exemplary embodiments can be easily construed by one skilled in the art.

While exemplary embodiments have been particularly shown and described, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the invention is defined not by the detailed description of exemplary embodiments but by the appended claims, and all differences within the scope will be construed as being included in the inventive concept.

What is claimed is:

1. A non-transitory computer readable storage medium comprising:

a user data area comprising user data recorded thereon; and a temporary disc management area comprising a first space bitmap and a second space bitmap recorded thereon, the first space bitmap and the second space bitmap indicating a recording status of recording unit blocks of the user data area, wherein the second space bitmap comprises start address information of the user data area represented by the second space bitmap, wherein the second space bitmap is assigned when a size of the first space bitmap is insufficient to represent the recording status of the recording unit blocks of the user data area, and wherein the start address information in the second space bitmap is determined according to a capacity of the user data area represented by the first space bitmap.

2. An apparatus for recording data on a computer-readable storage medium, the apparatus comprising:

a pickup unit which emits or receives a light so as to transfer data to the computer-readable storage medium, which comprises a user data area comprising user data recorded thereon, and a temporary disc management area comprising a first space bitmap and a second space bitmap recorded thereon, the first space bitmap and the second space bitmap indicating a recording status of recording unit blocks of the user data area; and a controller which controls the pickup unit to record the second space bitmap comprising start address information of the user data area represented by the second space bitmap, wherein the second space bitmap is assigned when a size of the first space bitmap is insufficient to represent the recording status of the recording unit blocks of the user data area, and wherein the start address information in the second space bitmap is determined according to a capacity of the user data area represented by the first space bitmap.

3. An apparatus for reproducing data from a computer-readable storage medium, the apparatus comprising:

a pickup unit which emits or receives a light so as to transfer data to the computer-readable storage medium, which comprises a user data area comprising user data recorded thereon, and a temporary disc management area comprising a first space bitmap and a second space bitmap recorded thereon, the first space bitmap and the second space bitmap indicating a recording status of recording unit blocks of the user data area; and a controller which controls the pickup unit to read start address information of the user data area represented by the second space bitmap from the second space bitmap, wherein the second space bitmap is assigned when a size of the first space bitmap is insufficient to represent the recording status of the recording unit blocks of the user data area, and wherein the start address information in the second space bitmap is determined according to a capacity of the user data area represented by the first space bitmap.

4. A method of recording data on a computer-readable storage medium that comprises a user data area comprising user data recorded thereon, and a temporary disc management area comprising a first space bitmap and a second space bitmap recorded thereon, the first space bitmap and the second space bitmap indicating a recording status of recording unit blocks of the user data area, the method comprising:

recording the second space bitmap comprising start address information of the user data area represented by the second space bitmap, wherein the second space bitmap is assigned when a size of the first space bitmap is insufficient to represent the recording status of the recording unit blocks of the user data area, and wherein the start address information in the second space bitmap is determined according to a capacity of the user data area represented by the first space bitmap.

5. A method of reproducing data from a computer-readable storage medium that comprises a user data area comprising user data recorded thereon, and a temporary disc management area comprising a first space bitmap and a second space bitmap recorded thereon, the first space bitmap and the second space bitmap indicating a recording status of recording unit blocks of the user data area, the method comprising:

reproducing start address information of the user data area represented by the second space bitmap from the second space bitmap, wherein the second space bitmap is assigned when a size of the first space bitmap is insufficient to represent the recording status of the recording unit blocks of the user data area, and wherein the start address information in the second space bitmap is determined according to a capacity of the user data area represented by the first space bitmap.

* * * * *